(No Model.)
E. EKKER.
DEVICE FOR SUSPENDING AND SPREADING SLAUGHTERED ANIMALS.
No. 384,433. Patented June 12, 1888.
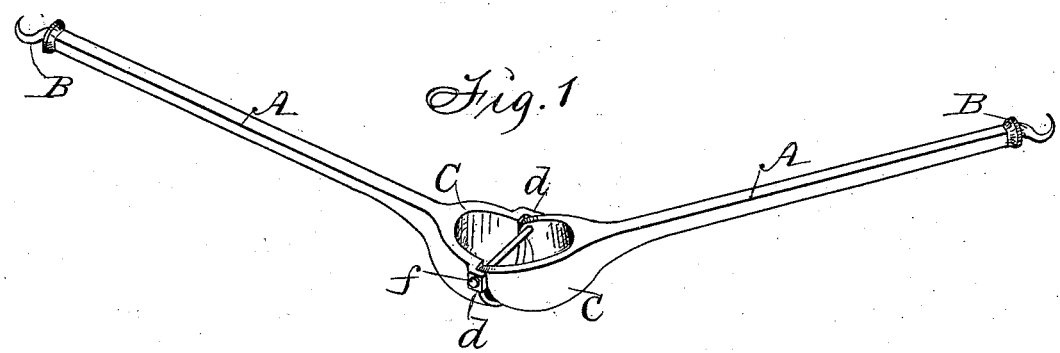
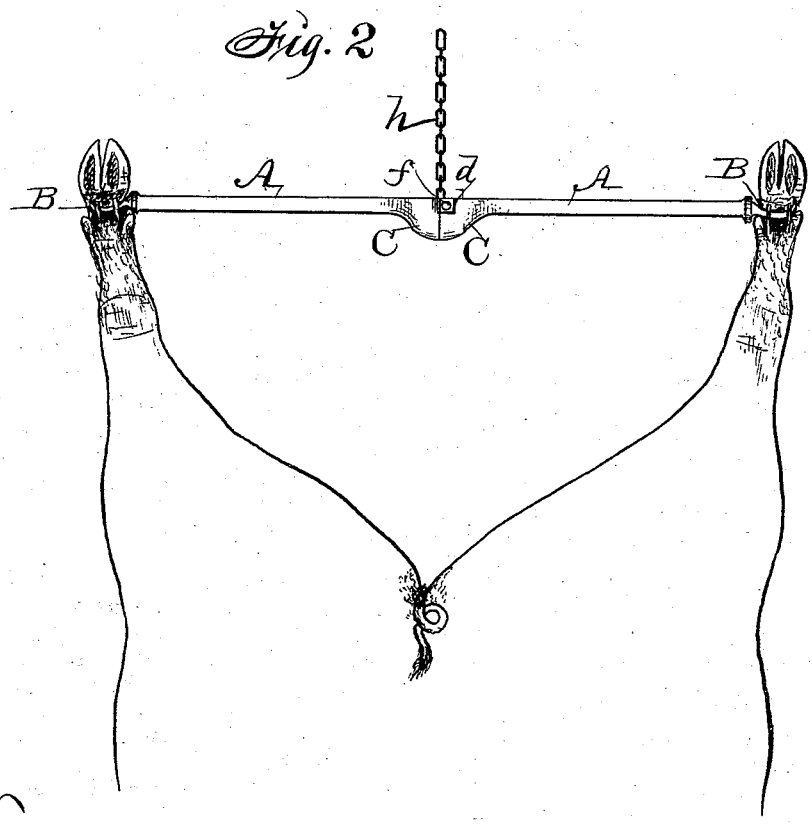
Witnesses:
R. H. Orwig
M. P. Smith
Inventor:
Everard Ekker,
By Thomas G. Orwig, Attorney.

UNITED STATES PATENT OFFICE.

EVERARD EKKER, OF KNOXVILLE, IOWA.

DEVICE FOR SUSPENDING AND SPREADING SLAUGHTERED ANIMALS.

SPECIFICATION forming part of Letters Patent No. 384,433, dated June 12, 1888.

Application filed March 15, 1888. Serial No. 267,226. (No model.)

*To all whom it may concern:*

Be it known that I, EVERARD EKKER, a citizen of the United States of America, and a resident of Knoxville, in the county of Marion and State of Iowa, have invented a new and useful Device for Suspending and Spreading Slaughtered Animals, of which the following is a specification.

My object is to facilitate the labor of a butcher in hanging up and dressing animals for the market; and my invention consists in the construction of a jointed spreader having hooks on its ends to fasten to the hind feet or legs of a hog or other animal, and a chain and hook at its center for suspending and balancing the entire carcass, as hereinafter fully set forth, pointed out in my claims, and illustrated in the accompanying drawings, in which—

Figure 1 is a perspective view of the device, and Fig. 2 is a view showing it in practical use.

A A are straight bars of metal or wood that may vary in length as desired. The outer ends have hooks B formed on or fixed thereto in such a manner that they will be adapted to fasten to the tendons of an animal's foot or leg in a common way. The inner ends have enlargements C, preferably malleable iron, fixed thereto in such a manner that they can be readily connected to produce a stiff-backed hinge-joint that will bend upward when an animal is suspended from the complete device. The parallel corners of each enlargement C have integral perforated ears $d$, through which a pin or bolt, $f$, is passed and then fastened by a nut, by riveting, or in any suitable way, as required to connect the two mating parts.

$h$ is a chain fixed to the pin in such a manner that the complete device can be readily connected with a tackling and a scaffolding, or other suitable means for elevating, spreading, and suspending an animal attached to the hooks B. Then the chain is fastened to a suitable support and one of the hooks B fastened to one of the legs of a hog and the opposite end of the device then pulled down and operated as a lever of the first order to partially lift the hog, so that when the other hook is fastened to the other leg the hog will be automatically elevated as the device is allowed to assume a horizontal position and to balance the weight suspended from a single central point by means of the chain connected with the center of the jointed device, as shown in Fig. 2.

I claim as my invention—

The device consisting of the bars A, having hooks B at their outer ends, and the counterparts C of a hinge joint at their inner ends connected by means of a bolt or pin, and a chain fixed to the center of the said pin or bolt to operate in the manner set forth, for the purposes stated.

EVERARD EKKER.

Witnesses:
H. G. DIXON,
O. J. KENDIG.